United States Patent [19]

Kluczynski et al.

[11] 4,200,247

[45] Apr. 29, 1980

[54] CASSETTE FOR ROLL FILMS, WITH A CATCH FOR PREVENTING DRAWING IN OF THE END OF THE FILM

[75] Inventors: Achim Kluczynski, Overath; Erik Altmann, Muehlheim, both of Fed. Rep. of Germany

[73] Assignee: AGFA-Gevaert, A.G., Leverkusen, Fed. Rep. of Germany

[21] Appl. No.: 5,982

[22] Filed: Jan. 23, 1979

[30] Foreign Application Priority Data

Jan. 28, 1978 [DE] Fed. Rep. of Germany ....... 2803758

[51] Int. Cl.$^2$ ................................................ G03B 1/04
[52] U.S. Cl. ................................................ 242/71.2
[58] Field of Search ............ 242/71.2, 71.1, 195, 242/197; 354/174, 275, 277, 216; 352/72, 75, 78 R, 78 C

[56] References Cited

U.S. PATENT DOCUMENTS

| | | | |
|---|---|---|---|
| 3,384,318 | 5/1968 | Nerwin et al. | 242/71.1 |
| 3,955,771 | 5/1976 | Ishii et al. | 242/71.2 |

FOREIGN PATENT DOCUMENTS

| | | |
|---|---|---|
| 2255749 | 5/1973 | Fed. Rep. of Germany . |
| 2711454 | 3/1977 | Fed. Rep. of Germany . |
| 2711545 | 3/1977 | Fed. Rep. of Germany . |
| 2715554 | 10/1978 | Fed. Rep. of Germany . |
| 410071 | 5/1934 | United Kingdom ............ 242/71.1 |

*Primary Examiner*—John M. Jillions
*Attorney, Agent, or Firm*—Connolly and Hutz

[57] ABSTRACT

The invention relates to a cassette for roll film with a spool-less supply chamber for containing the film and a protective paper strip, a take-up chamber with a spool for taking-up the film and the paper strip, a bridge arranged between the two chambers to form a rear contact surface and a guide for the film and means to retain the end of the film in a desired position.

3 Claims, 7 Drawing Figures

U.S. Patent        Apr. 29, 1980        4,200,247
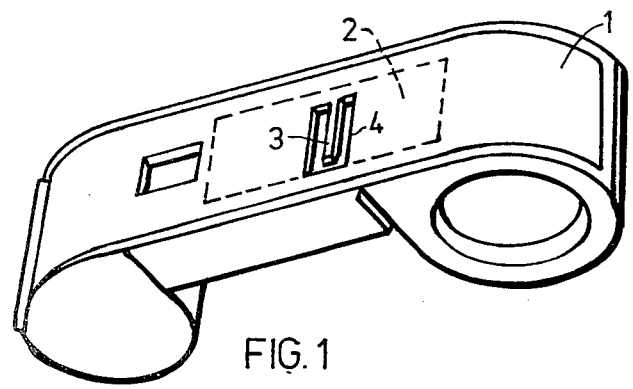
FIG. 1
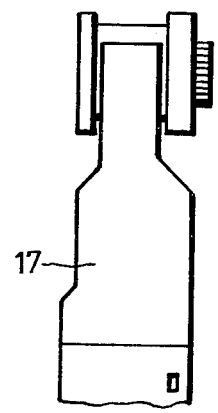
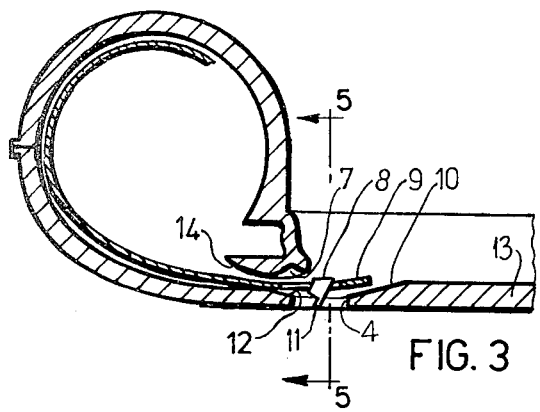
FIG. 2
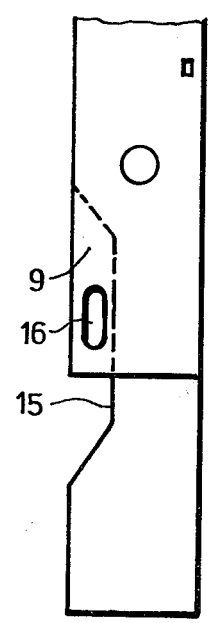
FIG. 4
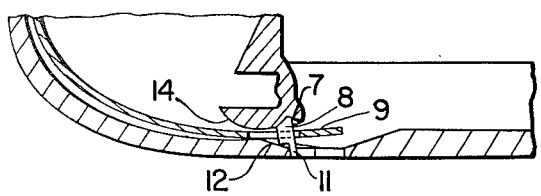
FIG. 3
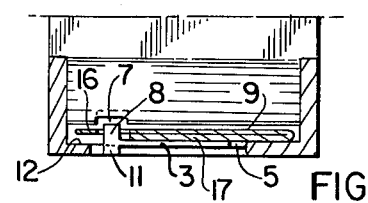
FIG. 5
FIG. 3A
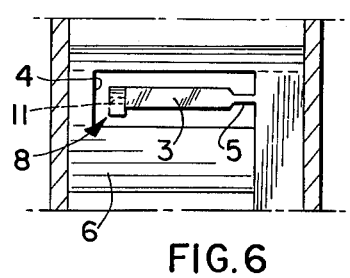
FIG. 6

CASSETTE FOR ROLL FILMS, WITH A CATCH FOR PREVENTING DRAWING IN OF THE END OF THE FILM

The invention relates to a cassette for roll film, comprising a spool-less supply chamber for a roll of film and a protective strip of paper, a take-up chamber with a spool for taking up the exposed film and the protective paper strip, a web therebetween which forms a rear contact surface and guide for the film, and a catch device for preventing the film from being drawn completely into the take-up chamber.

Film cassettes of this type are used for taking photographs using photographic equipment designed for that purpose, for example the roll film cassette of the Pocket-camera (Pak 110). German Offenlegungsschrift No. 2,255,749 describes a cassette of this type in which a film having an oblong perforation arranged obliquely to the direction of travel jumps on to a solid hook located inside the take-up chamber. The film is arched and the end of the film is thus jammed by the special shape of the hook so that the film catches on a projecting end thereof which is 5 mm long and can be removed from the take-up chamber in the dark for developing without damaging the cassette.

However, if the film becomes indesirably flat, which can easily occur in the photographic instrument under conditions which are too dry or too moist, the perforation inthe film may not engage in the hook so that catching does not take place. As a result the cassette has to be damaged in order to remove the film for development and this leads to stoppages of the film developing machines.

In German Offenlegungsschrift No. 2,715,554 and in German Offenlegungsschrift No. 2,711,454, dovetail indentations are formed in the cassette and a punched out area at the end of the films sinks into them and is hooked therein. In German Offenlegungsschrift No. 2,715,554, the punched out area is an end of the film which widens conically as the result of the punching operation and which lies in a correspondingly shaped part of the cassette. In German Offenlegungsschrift No. 2,711,545, the end of the film is hammer-shaped. These catch devices for the end of the film change the rectangular shape of the film, i.e. they interrupt the longitudinal edges of the film, so that it is not possible to scan the film with infra-red photocells, as is done in the case of picture-wise transportation in automatic copying machines. In addition, the cross-sections of the film are diminished by these punched out areas. With brittle films or too strong a pull in photographic apparatus which lacks frictional braking, the end of the film can easily tear and make the inlet catch unsuitable.

The object of the invention is to provide a cassette having reliably operating inlet catch which does not cause the film to shear off or damage the film, and which allows the cross-section of the film to be maintained as far as possible in order to prevent tearing so that the longitudinal edges of the film are not interrupted.

According to the invention there is provided a film cassette comprising a spool-less supply chamber for containing a roll of film and protective paper strip, a take-up chamber with a spool for taking up the film and the protective paper strip, a bridge arranged between the chambers to form a rear contact surface and guide for the film, a depression formed in the bridge of the cassette at the take-up end thereof before the take-up chamber and a resilient catch element, formed from the cassette wall and located in the depression, which catch element has a taper and is adapted to engage in a perforation at the end of the film whereby it is drawn by the film during transportation of the film through the film camera so that a knob thereon is urged against a limiting wall of the film passage and is received in a recess provided therein and simultaneously with a slope thereon is received in another recess, whereby the take-up chamber is sealed and the film retained in the desired position.

It has also been found that it is advantageous to provide the protective strip of paper in the region of the catching perforation in the film with a perforation which is several times larger than the catching perforation or to make it narrower by providing a punched out area parallel to the edge.

In an advantageous embodiment, the punched out area in the width of the cassette for the catch element has a label pasted over on the exterior thereof after charging the cassette, the label being a normal paper label which can be applied in known manner with a pressure-sensitive or other adhesive. However, a metal or plastics label which is impermeable to light may be used instead for this purpose in order to recreate a rear wall which is impermeable to light at this point.

It was surprising for the skilled man that this design according to the invention of a catching hook outside the take-up chamber hooks into the film exactly with any film under the most varied environmental conditions and prevents a desired length of the film from being drawn into the take-up chamber. The arrangement of the catching hook in a depression prevents the protective stip of paper or the film from being damaged, the cross-section of the film is not dimished, and the longitudinal edges are not interrupted as this would be an obstruction for automatic further processing.

An embodiment of the invention is described below with reference to the accompanying drawings, in which:

FIG. 1 is a perspective view from above of the exterior of the cassette;

FIG. 2 is a perspective view from below of the interior of the cassette;

FIG. 3 is a longitudinal section through a portion of the cassette including the take-up chamber; and FIG. 3A is a longitudinal section similar to FIG. 3 showing the knob on the catch element in a recess to retain the film end;

FIG. 4 shows a spool, a protective strip of paper and a film with the punched out areas.

FIG. 5 is a cross-sectional view taken through FIG. 3 along line 5—5 with knob and catch elements engaging within the film perforation; and FIG. 6 is a fragmental top plan view in cross-section illustrating the catch element in the recess.

In the rear-wall 1 of the cassette cover, in the area of the bridge 13 on the take-up side, a U-shaped recess 4 is provided which results in the formation of a catch element 3. The punched-out recess 4 has a label 2 adhered over its exterior to make the rear wall impermeable to light. The label 2 is, for example, paper secured to the cassette with pressure-sensitive adhesive or other adhesive. The label 2 could also be made of plastic or metal foil. The end of the catch element 3 which it is fixed on the cassette has a taper 5 which ensures that a desired predetermined bending position is defined. The catch element is arranged in a depression 6 (FIG. 2) which is set into the bridge 13 which defines the film plane. The catch element 3 is provided in its bending axis with an oblique orientation (see angle in FIG. 3), which ensures that when the catch element 3 is bent in the direction of transportation of the film, the film is bent out of the depression 6 into the film guide passage against a limiting wall 14 of the film passage in the take-up chamber (FIG. 3). The catch element 3 has a knob 8 on its free end which is of sufficient height just to reach the film plane without penetrating the film plane during transportation of the film when pictures are being taken.

A slope 11 is shaped at the free end of the underside of the catch element 3 and allows only predetermined bending of the catch element, thus ensuring a defined end position of the caught film 9.

A recess 7 is shaped in the limiting wall 14 of the film passage as a counter-bearing for the knob 8 of the catch element 3 and the knob 8 as shown in FIGS. 3A is drawn into this recess after engaging in the perforation 16 at the end of the film 9. On the opposite side, a slope 12 is formed on the cover at the end on the take-up side of the depression 6 and acts as a take-up plane for the slope 11 of the catch element 3. The catch element 3 can be brought into contact with the two parts 7 and 12 in such a way that the take-up chamber is completely sealed off from the film passage.

The procedure by which the inlet catch hooks into the end of the film is as follows:

The film 9 and the protective strip of paper 17 each have a slot therein just before the end in the direction of transportation, the slot or a recess 15 in the protective strip of paper being longer than the perforation 16 in the film 9.

The catch knob 8 of the catch element 3 lies at rest without any pressure against the protective strip of paper 17 during transportation of the film 9 when pictures are being taken. As shown in FIG. 4 slots 15 and 16 in the protective strip of paper 17 and film 9 toward the end of the film are drawn over the catch knob 8 of the catch element 3, and the film 9 and strip of paper 17 are relieved of pressure after the last photograph has been taken and are free to be pressed into the depression 6 by the catch element 3 as a result of the force imparted to the film by its being rolled up in the take-up chamber. The knob 8 as shown in FIG. 5 therefore jumps into the film perforation 16 and hooks it. As the film 9 is conveyed further, the catch element 3 is drawn against the parts 7 and 12 and the passage is sealed.

With this integral connection, it is not possible for the film to slide further as a result of pulling and the film remains in the desired final position which is dependent only upon the size and the location of the film perforation 16. The catch can be rapidly released by pulling the film against the direction in which it travels when photographs are being taken, and the film can be removed from the take-up chamber without damage.

We claim:

1. A film cassette for a film camera having a film passage comprising a spool-less supply chamber for containing a roll of film and protective paper strip, a take up chamber with a spool for taking up the film and the protective paper strip, a bridge arranged between the chambers to form a rear contact surface and guide for the film, a depression formed in the web at the take-up end thereof before the take-up chamber, a limiting wall and first and second recesses in the film passage, and a resilient catch element formed from the cassette wall and located in the depression, which catch element has a taper and a slope and is adapted to engage in a perforation at the end of the film whereby it is drawn by the film during transportation of the film through the film camera, a knob on the catch element which is urged against the limiting wall of the film passage and is received in the first recess provided therein and simultaneously the slope on the catch element is received in the second recess, whereby the take-up chamber is sealed and the film retained in the desired position.

2. A film cassette according to claim 1, wherein the protective strip of paper has a recess in the region of the film perforation.

3. A film cassette according to claim 1 or 2, wherein a label is affixed to the exterior of region of the bridge of the cassette in which the catch element is formed.

* * * * *